(12) United States Patent
Hall (10) Patent No.: US 9,707,809 B2
(45) Date of Patent: Jul. 18, 2017

(54) ARTICLE HANDLING APPARATUS (75) Inventor: Jamie Vincent Clarke Hall, Thornlie (AU)

(73) Assignee: Austin Engineering Ltd., Kewdale (AU)

( * ) Notice: Subject to any disclaimer, the term of this patent is extended or adjusted under 35 U.S.C. 154(b) by 349 days.

(21) Appl. No.: 13/984,742

(22) PCT Filed: Feb. 13, 2012

(86) PCT No.: PCT/AU2012/000138
§ 371 (c)(1),
(2), (4) Date: Jan. 28, 2014

(87) PCT Pub. No.: WO2012/106780
PCT Pub. Date: Aug. 16, 2012

(65) Prior Publication Data
US 2014/0138502 A1    May 22, 2014

(30) Foreign Application Priority Data
Feb. 11, 2011   (AU) ................ 2011900454

(51) Int. Cl.
| | |
|---|---|
| B60B 30/06 | (2006.01) |
| B60C 25/13 | (2006.01) |
| B60C 25/125 | (2006.01) |
| B66F 9/18 | (2006.01) |
| E02F 3/96 | (2006.01) |

(Continued)

(52) U.S. Cl.
CPC .............. *B60C 25/13* (2013.01); *B60B 29/00* (2013.01); *B60C 25/125* (2013.01); *B66C 1/44* (2013.01); *B66F 9/184* (2013.01); *E02F 3/965* (2013.01); *F16M 13/02* (2013.01)

(58) Field of Classification Search
CPC . B25J 15/022; A47J 47/16; A47F 7/04; A47B 81/007; B25B 1/02; B25B 1/2452; B25B 1/2468
USPC .... 157/1.1, 11, 16, 21, 1.17, 1.2, 1.21, 1.22, 157/1.24, 1.26, 1.28, 1.35, 1.36, 1.42; 414/426, 783, 621; 248/689, 670, 671, 248/229.12, 229.22, 230.3, 231.41, 309.1, 248/316.1, 316.4; 211/41.7, 23; 269/3, 269/6, 95
See application file for complete search history.

(56) References Cited

U.S. PATENT DOCUMENTS

| | | | | |
|---|---|---|---|---|
| 1,948,434 A | * | 2/1934 | Stafford ................ | B60C 25/132 157/1.2 |
| 1,964,119 A | * | 6/1934 | Hendry ................... | B66F 5/00 211/23 |

(Continued)

FOREIGN PATENT DOCUMENTS

WO    2006/031109 A1    3/2006

*Primary Examiner* — Terrell McKinnon
*Assistant Examiner* — Michael McDuffie
(74) *Attorney, Agent, or Firm* — Rothwell, Figg, Ernst & Manbeck, P.C.

(57) ABSTRACT

An article handling apparatus comprising a handling frame comprising a plurality of arm members adapted to grip the article, at least one of the plurality of arm members being of variable length. There is also disclosed means for dismounting a tire from a wheel, the means comprising a housing and a pad, the housing being adapted to be releasably attached to gripping means and the pad adapted to break the bead of the tire to facilitate removal of the tire from the wheel.

24 Claims, 11 Drawing Sheets

(51) Int. Cl.
  *B60B 29/00* (2006.01)
  *B66C 1/44* (2006.01)
  *F16M 13/02* (2006.01)

(56) References Cited

U.S. PATENT DOCUMENTS

| | | | | |
|---|---|---|---|---|
| 2,545,157 A * | 3/1951 | McCrary | ............... | B60C 25/132 157/1.2 |
| 2,582,390 A * | 1/1952 | Moore | ............... | B60C 25/02 157/1.17 |
| 3,850,221 A * | 11/1974 | Zrostlik | ............... | B60C 25/142 157/1.2 |
| 3,851,696 A * | 12/1974 | Pihlaja | ............... | B60C 25/135 157/1.2 |
| 3,970,342 A * | 7/1976 | Cotton | ............... | B66F 9/183 157/1.21 |
| 4,051,966 A | 10/1977 | Cotton | | |
| 4,209,054 A * | 6/1980 | Parent | ............... | B60C 25/132 157/1.28 |
| 5,213,297 A * | 5/1993 | Laskowski | ............... | A47F 7/04 211/23 |
| 6,039,104 A * | 3/2000 | Cunningham | ............... | B60C 25/00 157/16 |
| 7,108,035 B2 * | 9/2006 | Corghi | ............... | B60C 25/138 157/1.1 |
| 7,159,633 B2 * | 1/2007 | Nemish | ............... | B60C 25/135 157/1.17 |
| 7,509,988 B1 * | 3/2009 | Nemish | ............... | B60C 25/01 157/17 |
| 7,543,622 B1 * | 6/2009 | Carpenter | ............... | B60C 25/138 157/1.1 |
| 7,793,699 B2 * | 9/2010 | Vanhouten | ............... | B60C 25/025 157/1.2 |
| 2004/0115035 A1 * | 6/2004 | Tygard | ............... | B66C 1/427 414/621 |
| 2005/0040296 A1 * | 2/2005 | Rosa | ............... | A47F 7/04 248/124.1 |
| 2005/0199349 A1 * | 9/2005 | Matteucci | ............... | B60C 25/0545 157/16 |
| 2006/0027334 A1 | 2/2006 | Boni | | |
| 2006/0254725 A1 * | 11/2006 | Gonzaga | ............... | B60C 25/0578 157/1.17 |
| 2007/0000616 A1 | 1/2007 | Rogalla et al. | | |
| 2008/0128093 A1 * | 6/2008 | Rogalla | ............... | B25J 15/106 157/1.28 |
| 2009/0155032 A1 | 6/2009 | Hedley et al. | | |
| 2009/0283221 A1 * | 11/2009 | Lawson | ............... | B60C 25/0596 157/1.17 |
| 2011/0155329 A1 * | 6/2011 | Magnani | ............... | B60C 25/138 157/1.17 |
| 2011/0284170 A1 * | 11/2011 | Lemser | ............... | G01M 1/045 157/1.1 |
| 2011/0290428 A1 * | 12/2011 | Roussel | ............... | B60C 25/0539 157/1.22 |

* cited by examiner

ARTICLE HANDLING APPARATUS

CROSS REFERENCE TO RELATED APPLICATIONS

This application is a 35 U.S.C. §371 National Phase Entry Application from PCT/AU2012/000138, filed Feb. 13, 2012, and designating the United States, which claims priority under 35 U.S.C. §119 to Australian Patent Application No. 2011900454 filed Feb. 11, 2011, which is incorporated herein in its entirety.

FIELD OF THE INVENTION

The present invention relates to devices for handling articles.

The invention has been devised particularly, although not necessarily solely, in relation to an apparatus for handling a wheel, tyre or other vehicle component.

BACKGROUND ART

The tyres of vehicles need to be regularly replaced. Also, tyres on occasions suffer damage during use and, thus, need to be repaired or replaced.

To replace or repair a damaged tyre, the tyre generally needs to be dismounted from the wheel to which it is attached. For this, the wheel is removed from the axle of the vehicle. The tyre is then dismounted from the rim of the wheel, repaired and fitted again to the wheel rim. If the tyre cannot be repaired, a new tyre will be fitted to the wheel rim.

The dismounting and mounting of the wheel from the axle of the vehicle can be a cumbersome and dangerous. This is particularly so for wheels of relatively large size, such as wheels of mining equipment and vehicles used in the mining industry.

Also, detachment of the tyre from the rim of the wheel requires breaking the beads of the tyre for release of the tyre from the rim. The breaking of the bead is accomplished by inserting an end of a bead breaker between the tyre and the rim of the vehicle. This procedure may require application of a force of relatively large magnitude to insert the bead breaker between the tyre and the rim.

Also, tyre handling apparatus on occasions may need to operate in confined spaces such as an underground mine or tunnel.

It is against this background that the invention has been developed

SUMMARY OF THE INVENTION

According to a first aspect of the invention there is provided an article handling apparatus comprising a handling frame comprising a plurality of arm members adapted to grip the article, at least one of the plurality of arm members being of variable length.

Preferably, all of the arm members are of variable length.

Preferably, the handling frame comprises a central body comprising openings adapted to receive the arm members.

Preferably, the arm members comprise an inner end and a second end, the inner end being adapted to be inserted in an opening of the central body and the second end comprising gripping means adapted to grip the article.

Preferably, the central body is of polygonal configuration having a plurality of side walls interconnected to define a plurality of vertices wherein each vertex comprises one of the openings adapted to receive the second end of an arm member of the plurality of arm members.

Preferably, the opening is located adjacent to the intersection of two of the side walls that define the respective vertex and extends onto one of the side walls defining the vertex. This arrangement allows the arm members to move parallel to the other side wall defining the respective vertex.

Preferably, the article handling apparatus further comprises sleeve members that extend from each opening and are adapted to receive the arm members.

Preferably, the second end of each arm comprises gripping means.

Preferably, the gripping means extend perpendicularly to the arm members.

Preferably, the gripping means comprise a gripping surface.

Preferably, the gripping means are adapted to surround the article.

Preferably, the gripping means are adapted to receive covering means defining a cage adapted to surround the article during operation of the handling apparatus.

Preferably, the article may comprise a wheel having a tyre and a rim.

Preferably, the central body is adapted to receive the wheel.

Preferably, the article handling apparatus further comprises means for dismounting the tyre from the rim.

In an arrangement, the means for dismounting the tyre from the rim comprise at least one tooth member adapted to break the bead of the tyre to facilitate removal of the tyre from the rim.

Preferably, the central body of the handling frame comprises the at least one tooth member.

Preferably, the at least one tooth member is adapted to be in a collapsed position for handling of the wheel and in upright position to facilitate removal of the tyre from the rim.

In an alternative arrangement, the means for dismounting the tyre from the rim are adapted to be releasably attached to the gripping means.

Preferably, the means for dismounting the tyre from the rim comprise a housing adapted to receive the gripping means for releasably attaching to the gripping means the means for dismounting the tyre from the rim.

Preferably, the means for dismounting the tyre from the rim further comprises a pad adapted to break the bead of the tyre to facilitate removal of the tyre from the rim, the pad being attached to the housing.

Preferably, the pad is releasably attached to the housing.

Preferably, the pad is adapted to swivel with respect to the housing to allow alignment with the side wall of the tyre during dismounting of the tyre from the rim.

Preferably, the pad comprises an angled face and a raised pad member adapted to receive the side wall of the tyre.

According to a second aspect of the invention there is provided an article handling apparatus comprising a support frame and a handling frame attached to the support frame, the handling frame comprising a plurality of arm members adapted to grip the article, at least one of the plurality of arm members being of variable length.

Preferably, the handling frame is pivotally attached to the support frame.

Preferably, the article handling apparatus further comprises at least one hydraulic cylinder for pivotally moving the handling with respect to the support frame.

Preferably, the support frame is adapted to be attached to a vehicle.

Preferably, the vehicle comprises a front end loader.

According to a second aspect of the invention there is provided a device for breaking a tyre bead, the device comprising a housing and a pad attached to the housing, the housing being adapted to be releasably attached to at least one of gripping means of the article handling apparatus in accordance with the first or second aspect of the invention, wherein the pad is adapted to break the bead of a tyre to facilitate removal of the tyre from the rim.

Preferably, the pad is adapted to swivel with respect to the housing to allow alignment with the side wall of the tyre during dismounting of the tyre from the rim.

Preferably, the pad is releasably attached to the housing.

According to a third aspect of the invention there is provided a device for supporting a tool, the device comprising a housing adapted to receive the tool wherein the housing is adapted to be releasably attached to at least one of the gripping means of the article handling apparatus in accordance with the first or second aspect of the invention.

Preferably, the tool is releasably attached to the housing.

According to a fourth aspect of the invention there is provided an article handling apparatus comprising a handling frame having a central body comprising a side wall defining an inner space within the central body, and a plurality of arm members having each arm member an inner end adapted to be attached to the central body and an outer end adapted to grip the article, the side wall comprising openings adapted to slideably receive the inner end of each arm member to allow the arm members to be of variable length wherein the inner space is adapted to receive the inner ends of each arm member.

According to a fifth aspect of the invention there is provided an article handling apparatus for handling a wheel having a tyre and a rim, the article handling apparatus comprising a handling frame having a central body adapted to receive the wheel, and a plurality of arm members being adapted to extend outwardly from the central body for gripping of the wheel, wherein the central body comprises at least one tooth member adapted to break the bead of the tyre to facilitate removal of the tyre from the rim.

According to a sixth aspect of the invention there is provided an comprising a support frame, a handling frame pivotally attached to the support frame, and at least one hydraulic cylinder for pivotally moving the handling frame with respect to the support frame, the handling frame comprising a plurality of arm members adapted to grip the article, at least one of the plurality of arm members being of variable length.

BRIEF DESCRIPTION OF THE DRAWINGS

The present invention will be better understood by reference to the following description of specific embodiments thereof as shown in the accompanying drawings, in which.

DETAILED DESCRIPTION OF SPECIFIC EMBODIMENT(S)

Figure 1:
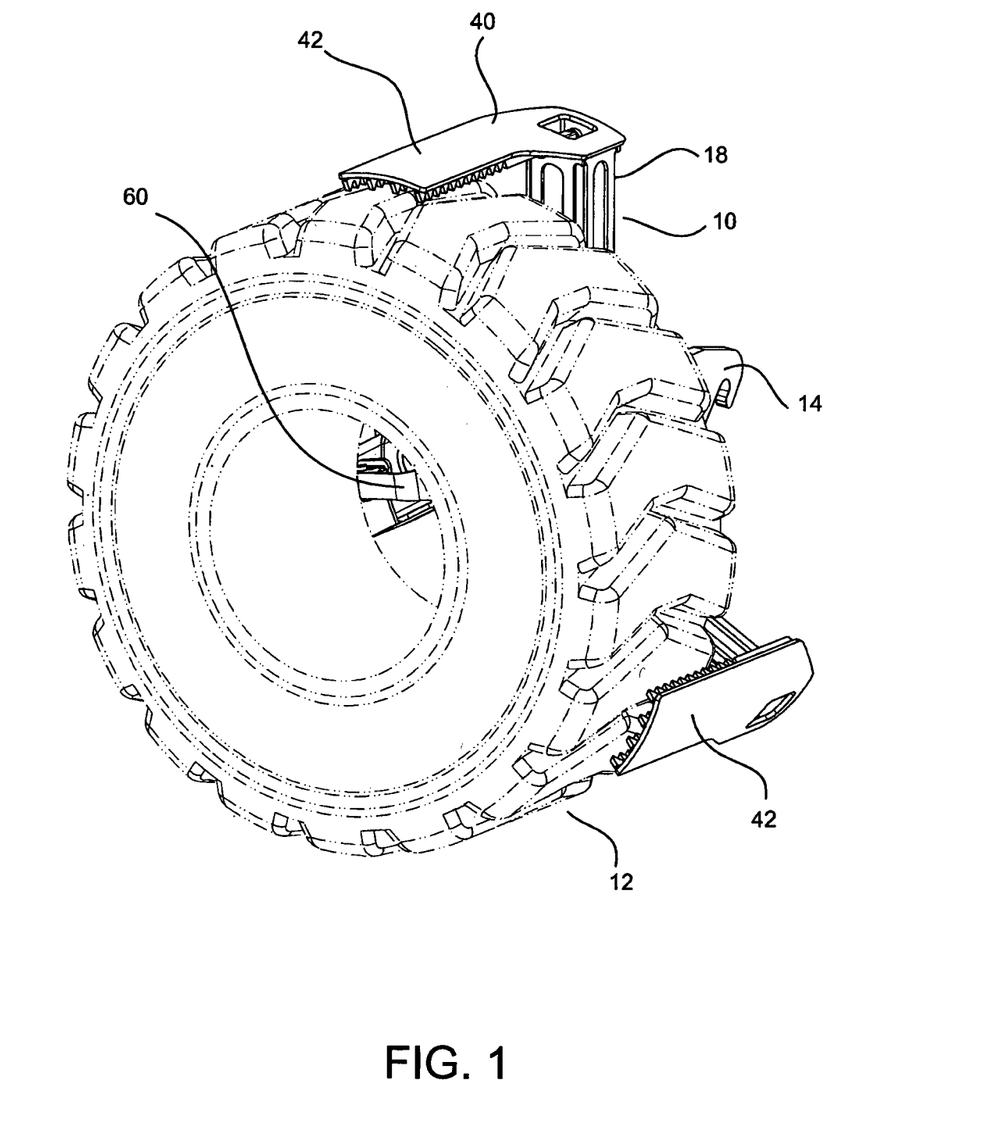
FIG. 1 is a perspective front view of the article handling apparatus according to a first embodiment of the invention in use.
Figure 2:
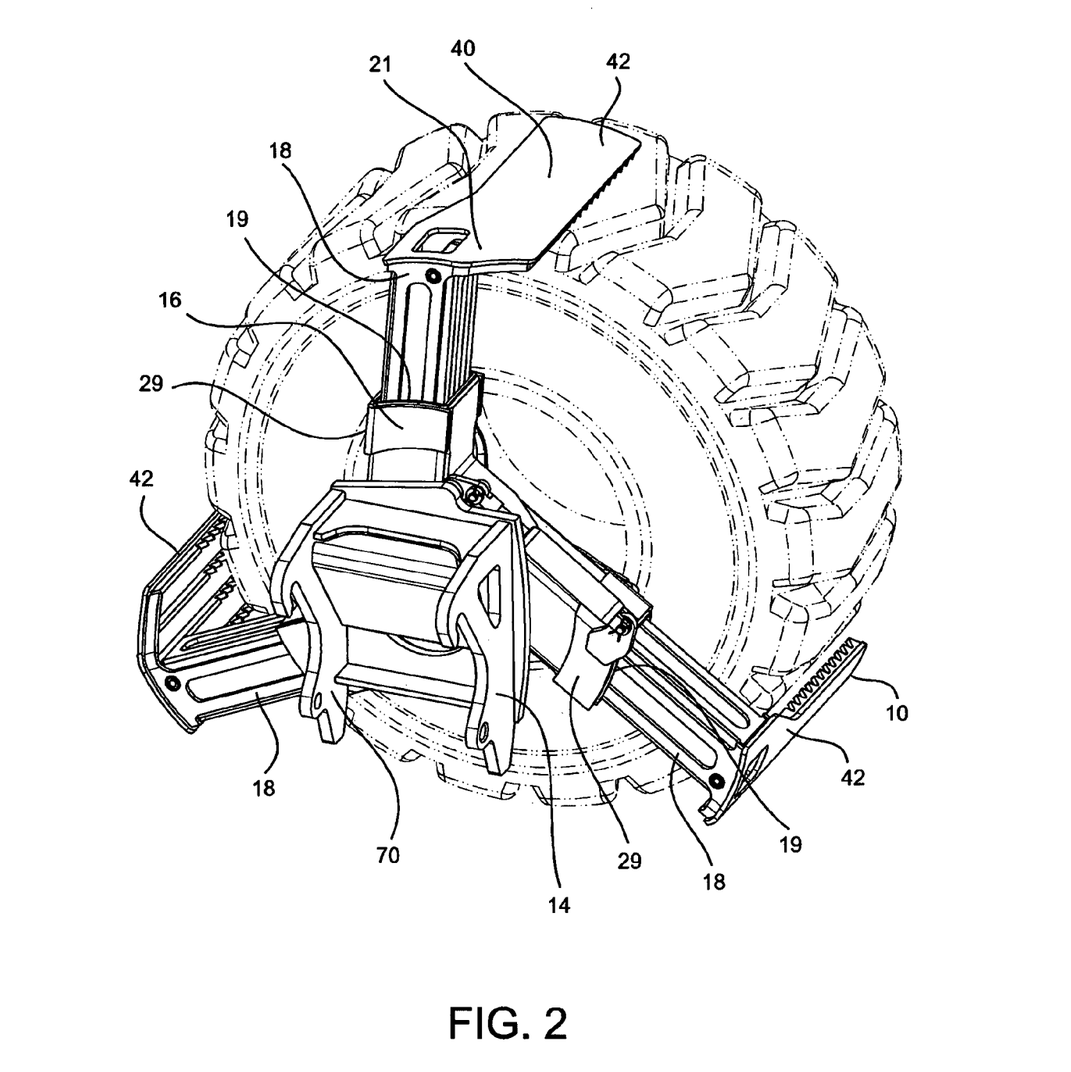
FIG. 2 is a perspective rear view of the article handling apparatus according to the embodiment of the invention shown in FIG. 1.
Figure 10:
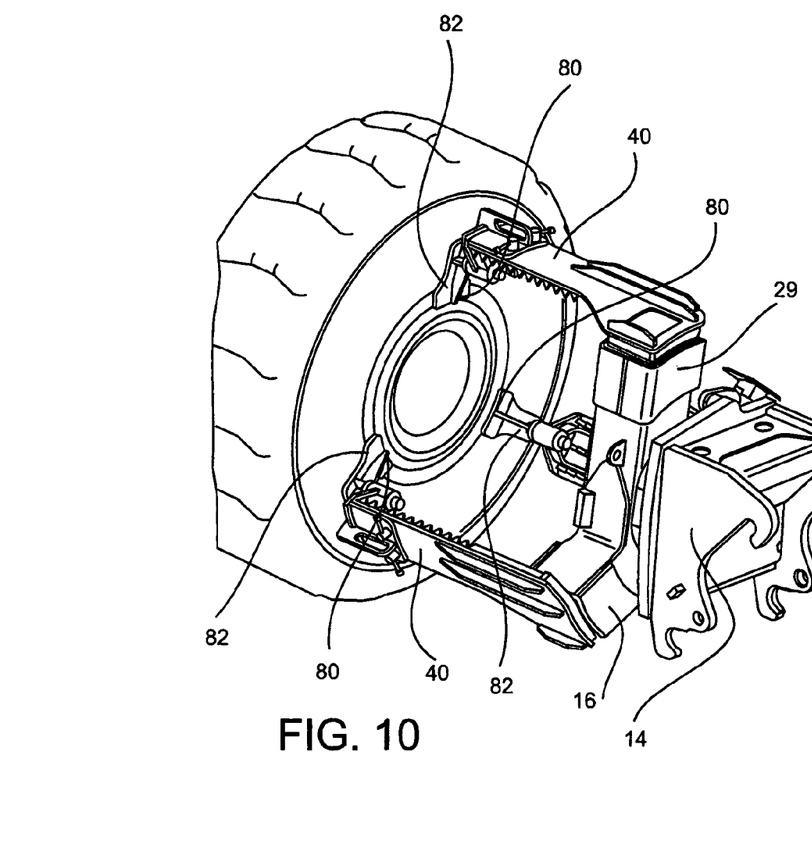
FIG. 10 is a perspective side view of the article handling apparatus according to a second embodiment of the invention in use.
Figure 11:
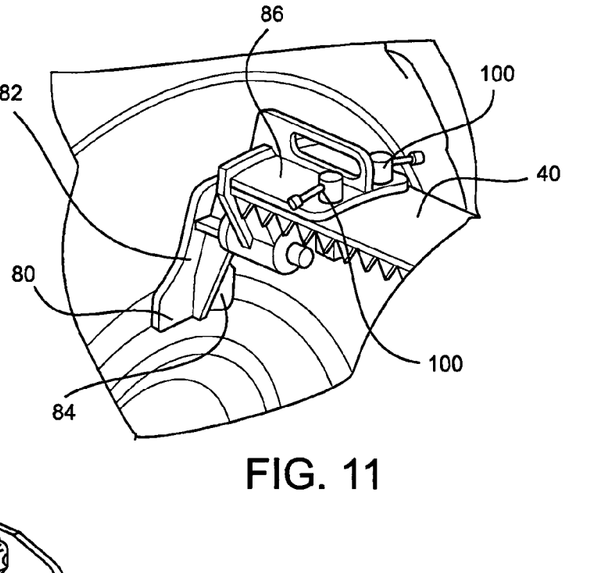
FIG. 11 is an enlarged view of the means for dismounting the tyre from the rim in use.
Figures 12, 13:
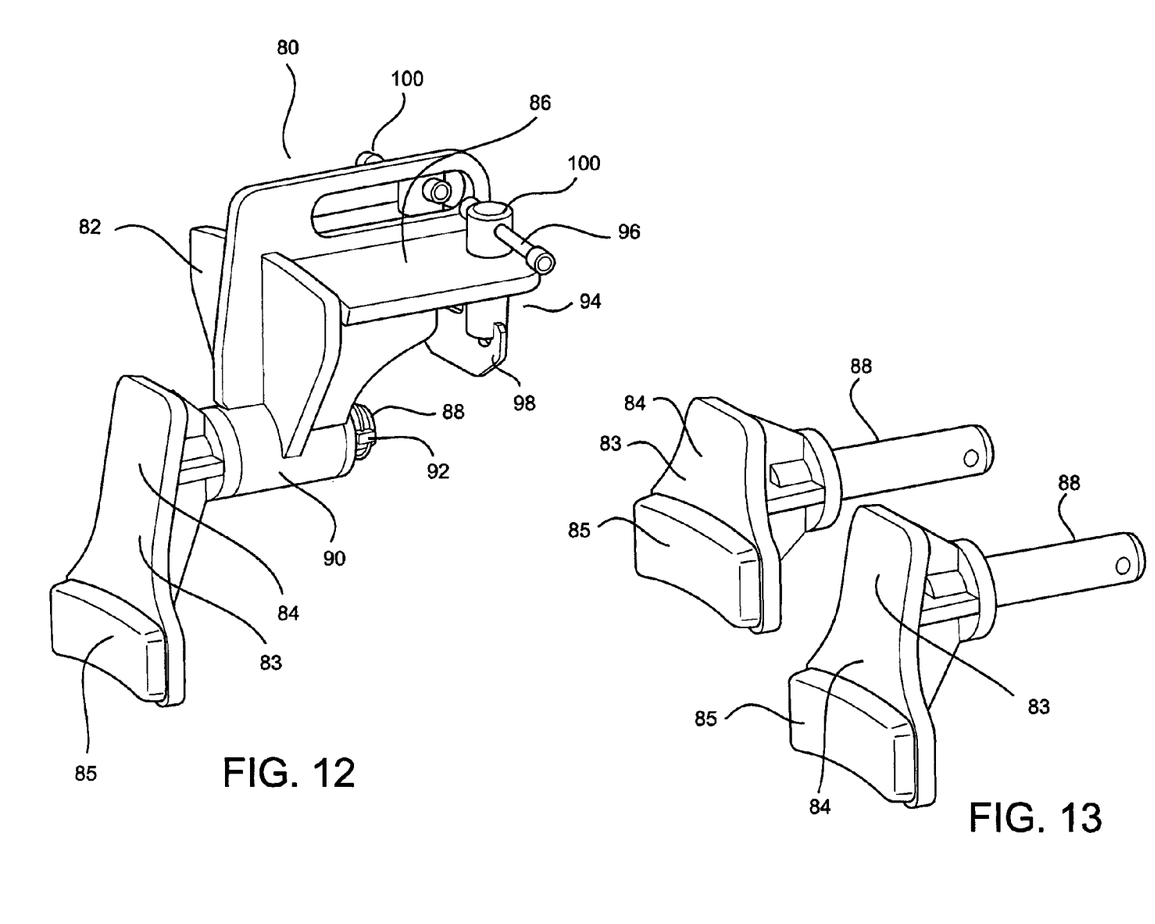
FIG. 12 is a perspective view of a first arrangement of the means for dismounting the tyre from the rim in accordance with the second embodiment of the invention.
FIG. 13 is a perspective view of second and third arrangements of the rim disassembly tool in accordance with the second embodiment of the invention.

FIGS. 1 and 2 show an article handling apparatus 10 according to a first embodiment of the invention. FIGS. 10 to 12 show an article handling apparatus 10 according to a second embodiment of the invention The article handling apparatus 10 is adapted to grasp and handle an article 12 such as a tyre or other vehicle components. Also, the article handling apparatus 10 according to the first and the second embodiment of the invention comprises means 80 for dismounting the tyre from the rim.

Figure 3:
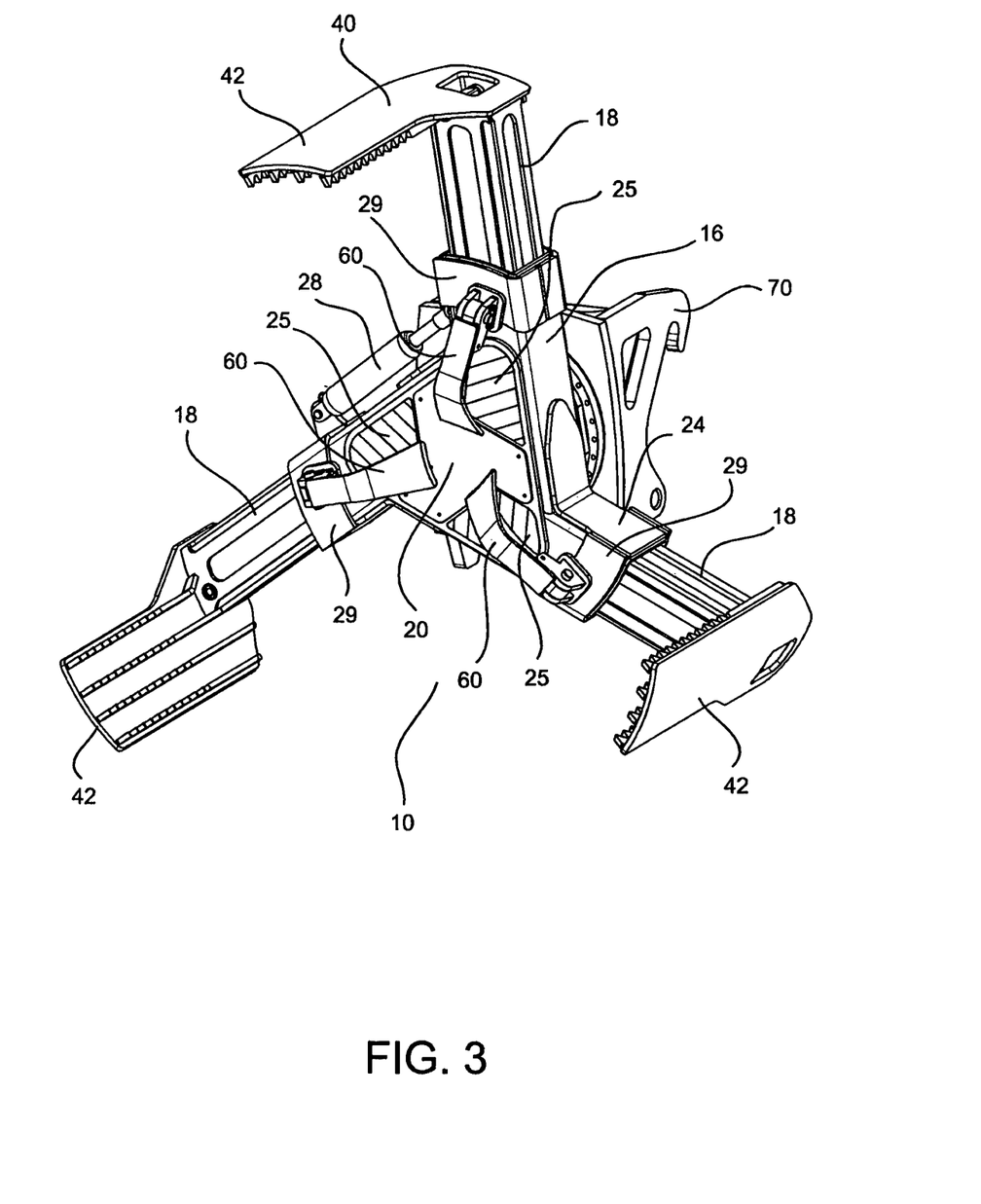
FIG. 3 is a perspective view of the article handling apparatus according to the embodiment of the invention shown in FIG. 1.

Referring to FIGS. 2 and 3, the article handling apparatus 10 includes a support frame 14 and a handling frame 16.

The handling frame 16 comprises a central body 20 and arm members 18. The arm members 18 extend outwardly from the central body 20. The arm members 18 are adapted to releasable attach the article 12 to the apparatus 10. The present embodiment includes three arm members 18. Other embodiments may include any number of arm members 18.

The arm members comprise inner ends (not shown) located inside the central body 20 and outer ends 21, opposite to the inner ends, located at a distance from the central body 20. The distance from which the arm members 18 extend from the central body 20 may be varied. In this way the article handling apparatus 10 may handle articles 12 of different sizes.

The central body 20 comprises openings 19 adapted to slideably receive the arm members 18. In this way the distance between the outer end 21 of each arm members 18 and the central body 20 is varied.

Further, the arm members 18 are adapted, to grip the article 12. For this, the arm members 18 include gripping means 40. The gripping means 40 are located at the outer ends 21 of the arm members 18. The gripping means 40 extend perpendicularly to the arm members 12 and the central body 12 (see FIG. 2).

Figure 8:
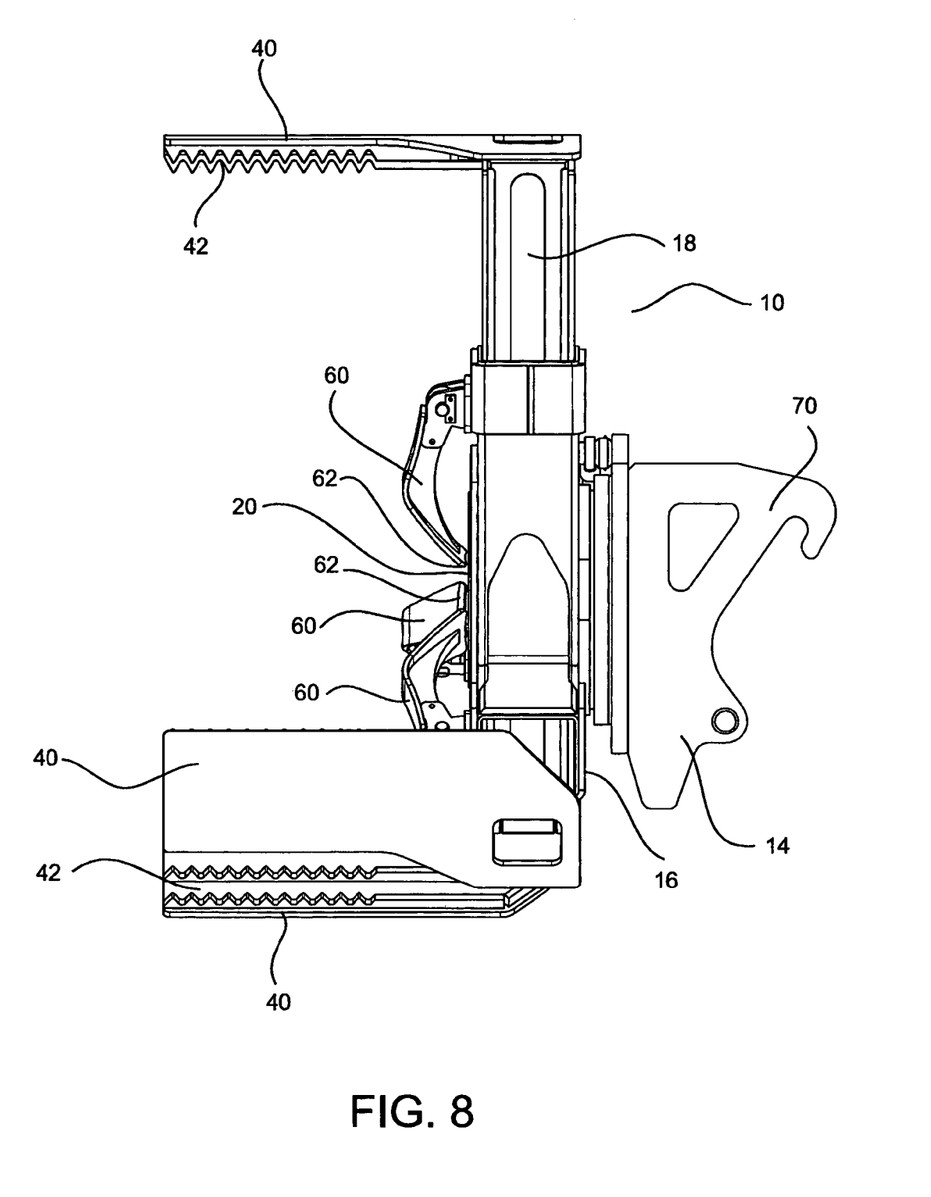
FIG. 8 is a side view of the article handling apparatus according to the embodiment of the invention shown in FIG. 1 having the arm members in extended condition.

The gripping means 40 comprise gripping surfaces 42. The gripping surfaces 42 facilitate maintaining the article 12 attached to the handling frame 16. This is because the gripping surfaces 42 comprise abrasive surfaces. The abrasive surfaces are adapted to retain the article 12 between the gripping means 40 during grasping and handling of the article 12 by the handling frame 16. As shown in FIG. 8, the gripping surface 42 comprises a plurality of rows 44 of teeth 46. The rows 44 are arranged parallel to each other.

As said before, the arm members 18 are adapted to slide into and out the central body 20. This allows the distance at which the outer end 21 of each arm member 18 extends from the central body 20 to be varied. The sliding of the arm members 18 into and out of the central body 20 is effected, for example, by one of any combination of hydraulic cylinders, electric motors or other activation means.

This arrangement allows the article handling apparatus 10 to handle articles of different sizes. Also, it allows the gripping force applied to the article 12 to be selectively varied when the article 12 is located between the gripping means 40.

The article handling apparatus 10 is particularly useful for grasping and handling tyre and wheels during, for example, mounting or dismounting wheels from the axle of vehicles.

The apparatus 10 may be attached to a front end loader. This allows mounting or dismounting of a wheel with assistance of the front end loader. For example, as will be explained in greater detail later, the wheel may be presented to an axle of a vehicle for mounting of the wheel to the axle of the vehicle. Also, where the wheel needs to be dismounted, the handling frame 16 may be presented to a wheel for securing the wheel to the handling frame 16 prior to release of the wheel from the axle of the vehicle.

The handling frame 16 is configured so that an operator of the wheel has access to the rim of the wheel during dismounting or mounting. As shown in FIG. 2, the wheel is adjacent to the central body 20 of the handling frame 16. The fact that the wheel is adjacent to the handling frame 16 allows an operator, located behind the handling frame 16, to reach into the centre region of the rim for loosening or tightening the nuts which secure the wheel to the axle of the vehicle. This is particularly useful during dismounting or mounting of the wheel to the axle of a vehicle.

Figure 6:
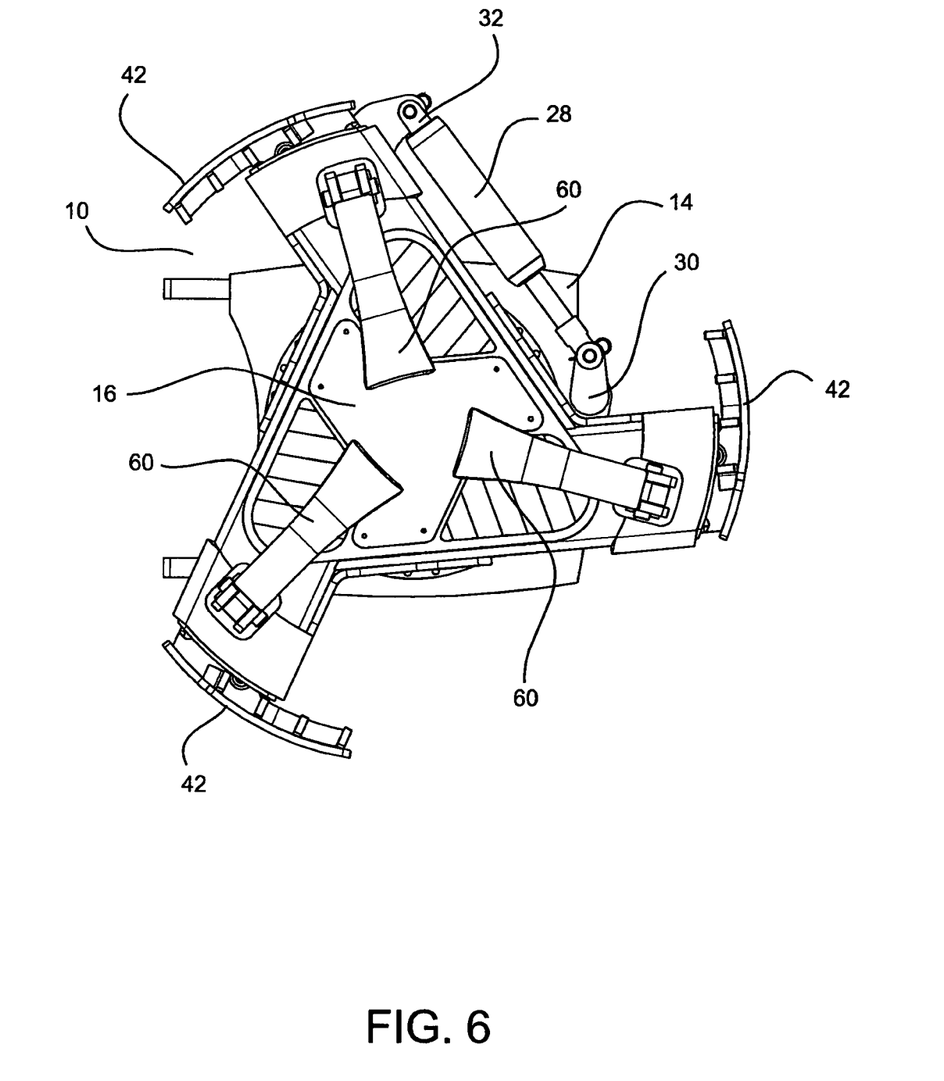
FIG. 6 is a front view of the article handling apparatus according to the embodiment of the invention shown in FIG. 1 having the arm members in retracted condition.
Figure 7:
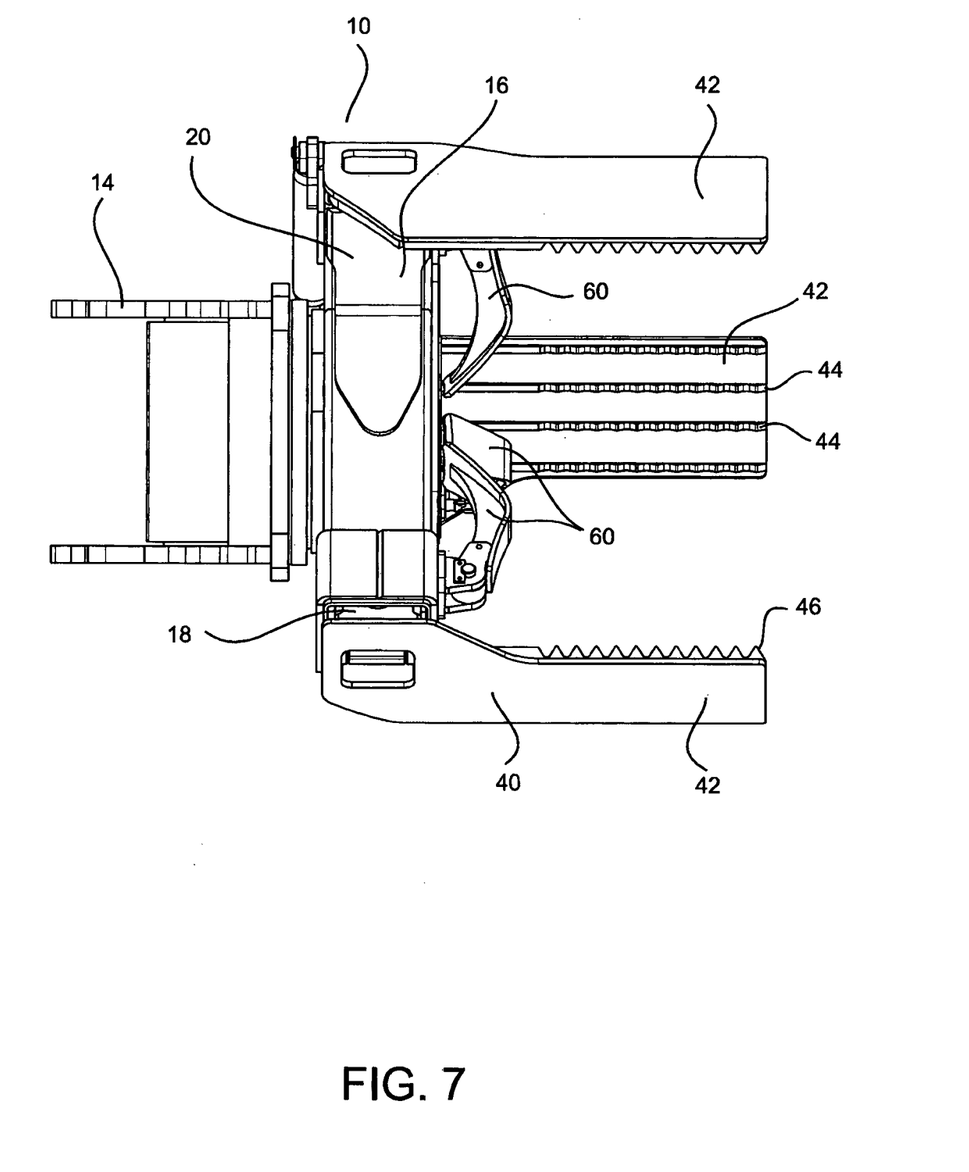
FIG. 7 is a side view of the article handling apparatus according to the embodiment of the invention shown in FIG. 1 having the arm members in retracted condition.

Further, the apparatus 10 can be placed in a retracted condition by drawing the arm members 18 into the central body 10 (see FIG. 6). In the retracted condition, the article handling apparatus 10 is able to be moved or stored in areas of restricted space. This is particularly advantageous for handling articles using the apparatus 10 in environments such as underground mines or tunnels. This provides a compact article handling apparatus 10 particular useful for moving and operating the article handling apparatus 10 inside areas having constrained spaces.

Figure 4:
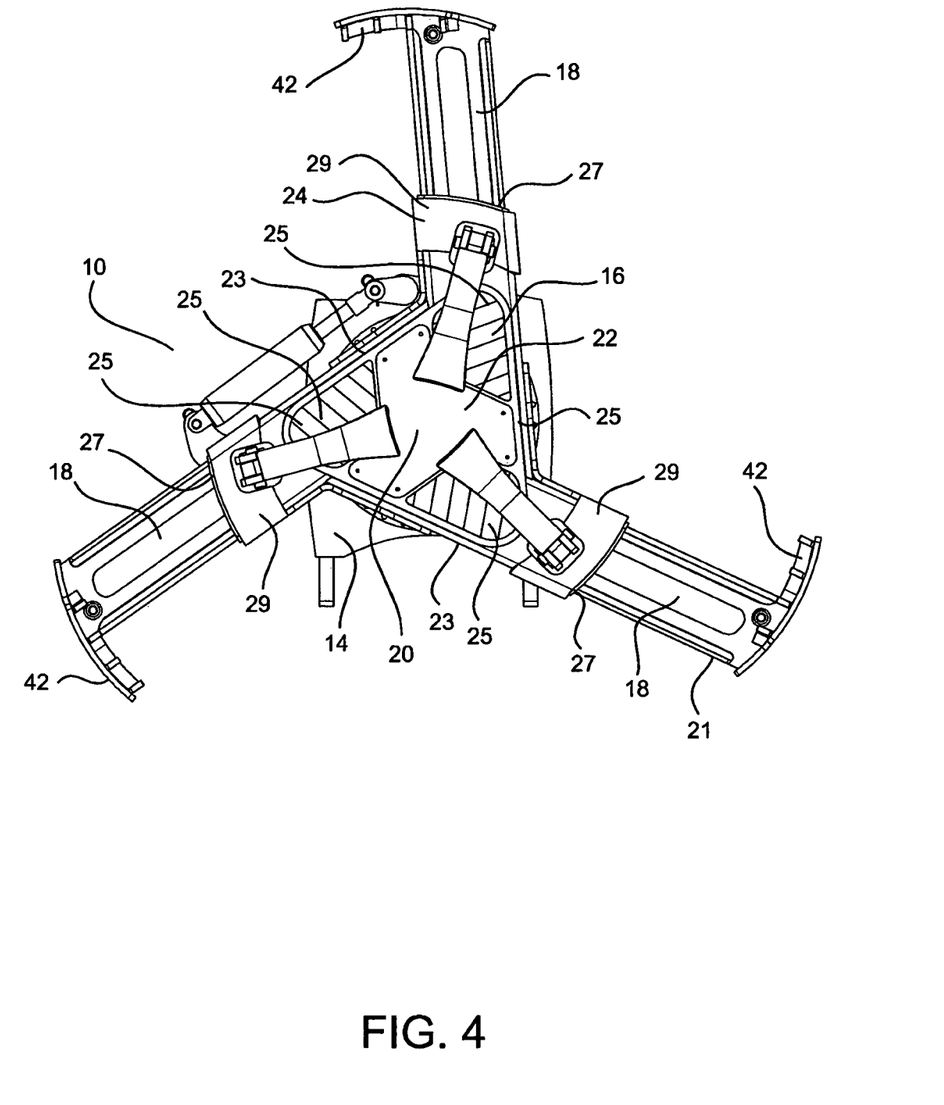
FIG. 4 is a front view of the article handling apparatus according to the embodiment of the invention shown in FIG. 1.

Referring to FIG. 4, the central body 20 is configured as a triangle having three side walls 23. The three side walls 23 are interconnected to define three vertices 25. Each vertex 25 is defined by two side walls 23. Referring to a single vertex 25, one of the side walls 23 defining the vertex 25 comprises an opening 27. The opening 27 is adapted to receive an arm member 18 and is located adjacent to the intersection of the two side walls 23 that define the vertex 25. This arrangement allows the arm member to move parallel the other side wall defining the vertex 25. The opening 27 comprises a sleeve member 29. The sleeve member 29 is adapted to guide the arm member into and out of the central body 20.

Embodiments of the invention other than the embodiment shown in FIGS. 1 to 9 may include central bodies 20 having any polygonal shape. This allows the inclusion of more than three arm members 18. Other embodiments may include only two arm members 18.

Figure 5:
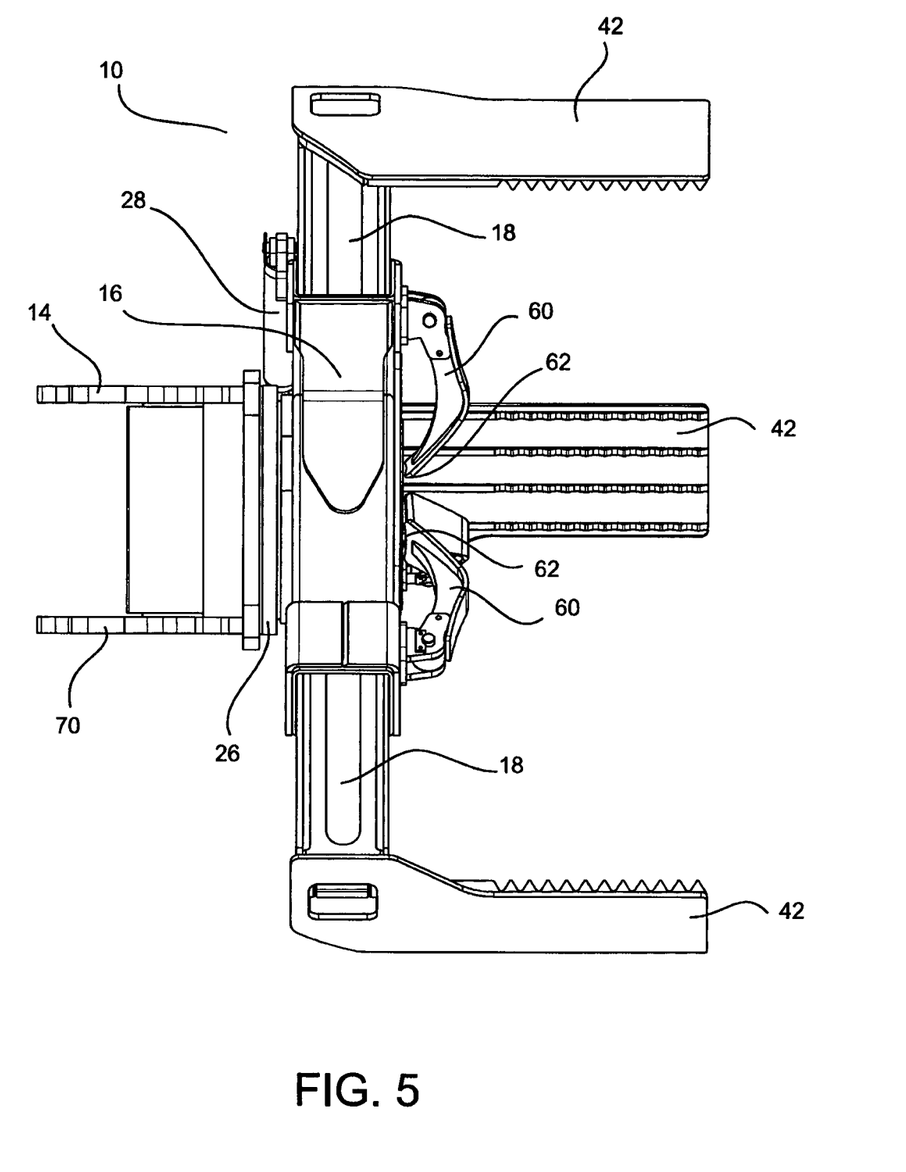
FIG. 5 is a side view of the article handling apparatus according to the embodiment of the invention shown in FIG. 1.

Referring now to FIGS. 5 and 6, the handling frame 16 is pivotally connected to the support frame 14. This permits rotation of the handling frame 16 with respect to the support frame 14. Rotating the handling frame 16 with respect to the support frame 14 is particularly advantageous during dismounting or mounting of a wheel to the axle of a vehicle.

The rotation of the handling frame 16 is effected by at least one hydraulic cylinder 28. As shown in FIG. 6, an end 30 of the hydraulic cylinder 28 is attached to the support frame 14. The opposite end 32 of the hydraulic cylinder 28 is attached to the handling frame 16. The handling frame 16 rotates with respect to the support frame 14 due to the variations in length of the hydraulic cylinder 28.

Figure 9:
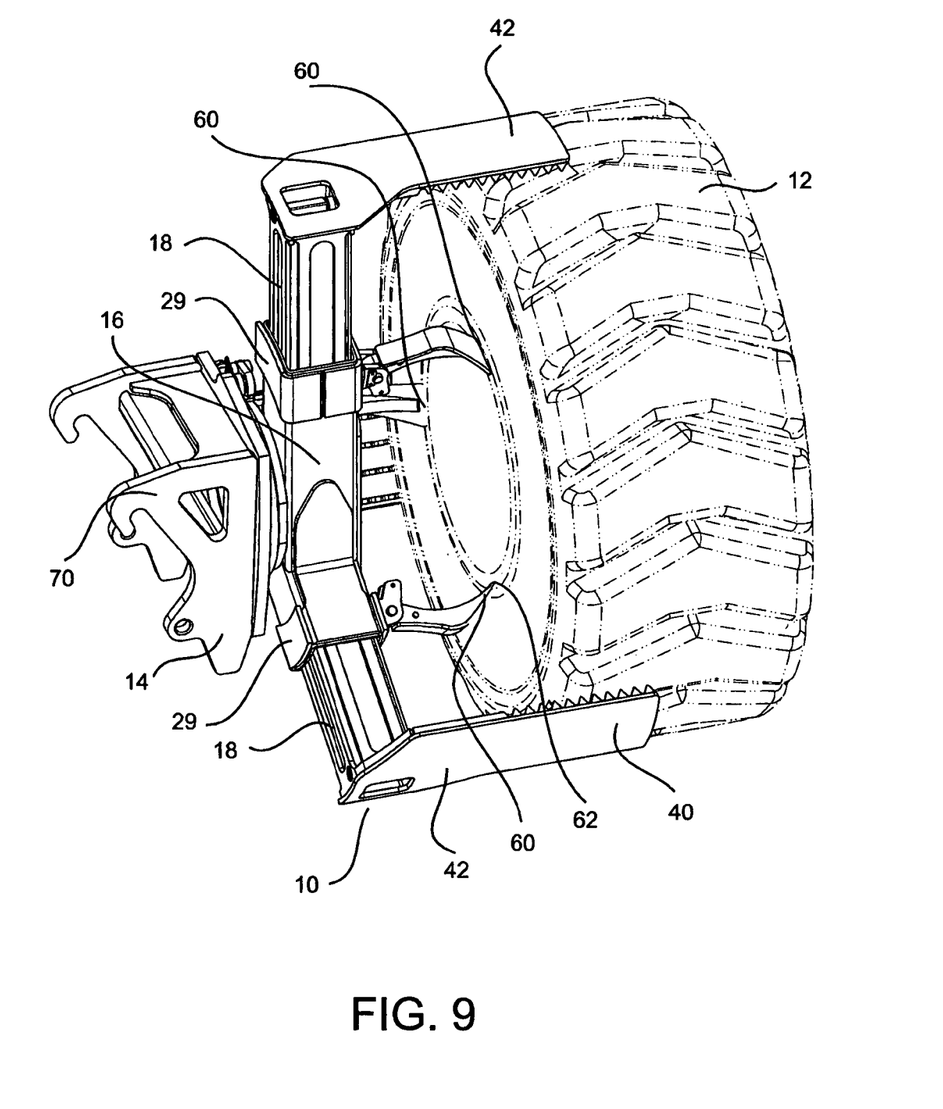
FIG. 9 is a perspective side view of the article handling apparatus according to the embodiment of the invention shown in FIG. 1 having the tooth members in extended condition.

Referring now to FIGS., 8 and 9, the central body 20 comprises tooth members 60. The tooth members 60 are located on the side of the central body 20 opposite to the support frame 12.

The tooth members 60 may be in a collapsed condition (see FIG. 8) or in an extended condition (see FIG. 9).

The tooth members 60 when in the extended condition are adapted to act as bead breakers. This facilitates dismounting of the tyre from the wheel rim. As shown in FIG. 9, free ends 62 of the tooth members 60 are inserted between the wheel rim and the tyre. This facilitates breaking the beads of the tyre for removal of the tyre from the wheel. The free ends 62 of the tooth members 60 are pushed between the rim and the tyre by moving the tooth members 60 from the collapsed condition to the extended condition.

The free ends 62 of the tooth members 60 may comprise an end edge to facilitate insertion of the tooth member 60 between the rim and the tyre.

FIGS. 10 to 12 show an article handling apparatus 10 in accordance with a second embodiment of the invention. The article handling apparatus 10 according to the second embodiment is similar to the apparatus according to the article handling apparatus 10 of the first embodiment and similar reference numerals are used to identify similar parts. In this second embodiment of the invention a different arrangement of the means 80 for dismounting the tyre from the rim is provided. In accordance with the second embodiment of the invention, the means 80 for dismounting the tyre from the rim comprise a rim disassembly tool 84 which is releasably attached to the gripping means 40 via a attachment means 86.

Referring to FIGS. 10 and 11, the means 80 for dismounting the tyre from the rim comprises the rim disassembly tool 84 and the attachment means 86. The rim disassembly tool 84 comprises a pad 83 and a pin member 88. The pad 83 is perpendicularly attached to the gripping means. In this manner, the pad 83 is arranged such that the pad 83 can be presented onto the rim and the tyre side wall (see FIG. 11). The pad 83 is adapted to swivel with respect to the attachment means 86. The swivel action of the pad 83 allows accurate alignment with the rim beat seat of the tyre and rim assembly. The swivel connection is accomplished by the pin member 88. The pin member 88 extends in a direction opposite to the surface of the pads 83. The pin member 88 is a cylindrical pin member 88 adapted to be received by the attachment means 86. For this the attachment means 86 comprises a cylindrical housing 90 adapted to receive the pin member 86. A releasable pin retainer 92 fastens the rim disassembly tool 84 to the attachment means 86. In this arrangement, the pin member 86 is releasably attached to the housing 90. The fact that the pin member 86 is releasable attached within the housing 90 allows replacement of the pad 83. In this manner, different types of pads 83 may be used to fit different type of wheels. The pads 83 may be custom built to suit different type of rims and tyres. FIGS. 12 and 13 show three different types of pads 83 to be used in conjunction with at least three different types of rims and tyres.

In other arrangements, of the second embodiment of the invention, specialty tools other than rim disassembly tools 84 may be attached to the attachment means 86 for use in conjunction with the article handling apparatus 10 in accordance with a second embodiment of the invention.

Referring to FIGS. 12 and 13, the pads 83 comprise an angled face having an upper portion and a lower portion. The lower portion comprises a raised pad member 85. The presence of the raised pad member 85 is particularly advantageous because it avoids damage to the rim components and the tyre side wall during dismounting of the tyre from the rim. As shown in FIGS. 12 and 13, the upper portions of each of the three pads 84 have different surface areas. This allows using the pads 84 with different sized rims and tyres.

As mentioned before, the attachment means 86 are adapted to releasably secure the means 80 to the gripping means 40. For this, the attachment means 86 comprises a housing 94 adapted to be attached to the gripping means 40 (see FIG. 12). The housing 94 comprises a top plate 96 and a bottom clamp bar assembly 98. The top plate 96 and the bottom clamp bar assembly 98 are configured such that the gripping surfaces 42 of the gripping means 40 slide between the top plate 96 and the bottom clamp bar assembly 98 (see FIG. 11). A plurality of screw lock pins 100 secures the gripping surfaces 42 between the top plate 96 and the bottom clamp bar assembly 98.

In operation, the article handling apparatus 10 in accordance with the first and second embodiment of the invention is adapted to transport the article 12. This is particularly useful during wheel dismounting procedures. For example, after dismounting of the wheel from the axle of the vehicle, the wheel may be transported to another location for repair or replacement of the tyre. For this, the support frame 14 is adapted to engage to a moveable structure or vehicle, such as a front end loader (not shown).

As shown in FIG. 2, the support frame 14 comprises coupling means 70. The coupling means 70 are adapted to be releasable attached to the end of two booms of the front end loader (not shown).

As said before, the apparatus 10 in accordance with the first and second embodiments of the invention may be used for dismounting or mounting of wheels. During dismounting of a wheel from a vehicle, the front end loader is initially located in front of the wheel to be dismounted. The front end loader must be located at a distance from the wheel such that the central body 20 of the handling frame 16 is adjacent to the wheel. In this position the gripping means 40 surround the wheel.

Prior to dismounting the wheel from the axle, the wheel is secured to the handling apparatus 10 by pressing the wheel between the gripping means 40. This is accomplished by varying the distance between the gripping means 40 and the central body 20. As mentioned, this distance is varied by sliding the arm members 18 into or out of the central body 20.

After securing the wheel to the handling frame 16, an operator loosens and releases the nuts that secure the wheel to the axle of the vehicle. As said before, the handling frame is arranged so as to facilitate access to the nuts of the wheels by an operator. As shown in FIG. 1, the operator can access the wheel nuts by standing behind the apparatus 10.

After releasing the nuts, the wheel can be released from the vehicle by reversing the front end loader.

The dismounted wheel can then be transported to an area for replacement or repair of the tyre. If required, as previously described, the handling frame 16 can be rotated with respect to support frame 14. This facilitates release of the wheels from the axle of the vehicle.

To replace or repair the tyre, the tyre must be dismounted from the rim. Dismounting the tyre from the rim requires breaking the beads of the tyre. For this, the article handling apparatus 10 according to the first and second embodiment of the invention comprises the means 80 for dismounting the tyre from the rim.

As previously described with reference to the first embodiment of the invention, the central body 20 of the handling frame 16 comprises tooth members 60 adapted to break the beads of the tyre.

For breaking the beads, the hand members 60 are moved from the collapsed condition to the extended condition to insert the free ends 62 of the hand members 60 between the tyre and the rim. This allows release of the tyre from the wheel.

After repairing or replacing the tyre, the repaired or new tyre is mounted to the rim of the wheel. For mounting the wheel on the vehicle, the wheel is grasped by the apparatus 10 using the arm members 18. The handling apparatus 10 is located adjacent to the vehicle in order to present the wheel to the axle of the vehicle. In circumstances where that the bolts and the openings of the rim do not coincide it is possible, as mentioned before, to rotate the handling frame 16 in order to allow the bolts to enter the respective rim openings. After mounting the wheel to the axle of the vehicle, the nuts may be fastened securing the wheel to the axle of the vehicle.

The article handling apparatus 10 according to the second embodiment of the invention is also suitable for dismounting the tyre from the rim. For this, means 80 for dismounting the tyre from the rim are provided. The means 80 are releasably attached to the gripping means 40. In particular, as described before, the means 80 for dismounting the tyre in accordance with the second embodiment of the invention comprises a housing 94 which is adapted to slide onto the gripping surface 42 of the gripping means 40.

In operation, the means 80 for dismounting the tyre in accordance with the second embodiment of the invention is attached to the gripping surfaces 42. To detach the tyre from the rim, the pads 83 of the rim disassembly tool 84 are presented to the side wall of the tyre (see FIG. 10). For breaking the beads of the tyre, the pads 84 are inserted between the tyre and the rim. This allows release of the tyre from the rim.

It is evident that the described tyre handling apparatus 10 provides an efficient and secure system for mounting and dismounting of a wheel. As previously described, during mounting or dismounting of the wheel, the wheel is supported on the central body 20. In this way an operator is located in a safe location behind the handling apparatus 10. Also, as explained before, this arrangement allows access of the nuts to an operator for releasing the wheel from the axle of the vehicle.

Modifications and variations as would be apparent to a skilled addressee are deemed to be within the scope of the present invention.

Further, it should be appreciated that the scope of the invention is not limited to the scope of the embodiments disclosed. By way of example, the gripping means 40 of the arm members 18 may extend such that the entire circumference of the tyre is covered by the gripping means 40. Alternatively, the gripping means 40 of the present embodiment may be adapted to receive covering means such as plates or wire mesh. These arrangements are particular advantageous because it provides a cage surrounding the wheel.

A cage surrounding the wheel protects personnel and structures surrounding the wheel during, for example, inflation or deflation of the tyre.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. An article handling apparatus comprising a handling frame having a central body comprising a plurality of side walls and a plurality of arm members, the side walls defining an inner space within the central body and being interconnected to define a plurality of vertices wherein each vertex comprises one opening providing access to the inner space of the central body,
    wherein the plurality of arm members having each arm member an inner end slideably received within the inner space of the central body through one of the openings of the vertexes and an outer end adapted to grip the article,
    wherein the opening is located adjacent to the intersection of two of the side walls that define the respective vertex and extends onto one of the side walls defining the vertex; and
    wherein the central body of the handling frame is adapted to receive a wheel having a rim and a tyre attached to the rim, and the central body comprises at least one tooth member adapted to break the bead of the tyre to facilitate removal of the tyre from the rim.

2. The article handling apparatus according claim 1 wherein the outer end of each arm member comprises gripping means adapted to grip the article.

3. The article handling apparatus according to claim 2 wherein the gripping means extend perpendicularly to the arm members.

4. The article handling apparatus according to claim 2 wherein the gripping means comprise a gripping surface.

5. The article handling apparatus according to claim 1 further comprising sleeve members that extend from each opening and are adapted to receive the arm members.

6. The article handling apparatus according to claim 1 wherein the central body is of polygonal configuration.

7. The article handling apparatus according to claim 6, wherein the central body is of triangular configuration having three side walls interconnected to define three vertices, wherein each side wall comprises one opening that provide access to the inner space of the central body, each opening being located adjacent to the intersection of the side walls.

8. The article handling apparatus according to claim 1 wherein the at least one tooth member can be configured to be in a collapsed position or an upright position.

9. The article handling apparatus according to claim 8, wherein the at least one tooth member has a free end, and wherein the free end of the tooth member is pushed between the rim and the tyre by moving the tooth member from a collapsed configuration to an extended configuration.

10. The article handling apparatus according to claim 1 wherein the at least one tooth member is adapted to be in a collapsed position for handling of the wheel and in upright position to facilitate removal of the tyre from the rim.

11. The article handling apparatus according to claim 1, further comprising a support frame, the handling frame having a central body pivotally attached to the support frame, and at least one hydraulic cylinder for pivotally moving the handling frame with respect to the support frame.

12. An article handling apparatus according to claim 11 wherein the support frame is adapted to be attached to a vehicle.

13. An article handling apparatus according to claim 12 wherein the vehicle comprises a front end loader.

14. An article handling apparatus comprising a handling frame having a central body comprising a plurality of side walls and a plurality of arm members, the side walls defining an inner space within the central body and being interconnected to define a plurality of vertices wherein each vertex comprises one opening providing access to the inner space of the central body,
    wherein the plurality of arm members having each arm member an inner end slideably received within the inner space of the central body through one of the openings of the vertexes, and an outer end adapted to grip the article;
    wherein the opening is located adjacent to the intersection of two of the side walls that define the respective vertex and extends onto one of the side walls defining the vertex; and
    wherein the central body of the handling frame is adapted to receive a wheel having a rim and a tyre attached to the rim, and wherein the outer end of the arm members comprise means for dismounting the tyre from the rim.

15. The article handling apparatus according to claim 14 wherein the means for dismounting the tyre from the rim are adapted to be releasably attached to the outer end of the arm members.

16. The article handling apparatus according to claim 14 the means for dismounting the tyre from the rim comprises a housing adapted for releasably attaching the means for dismounting the tyre from the rim to the outer end of the arm members.

17. The article handling apparatus according to claim 16 wherein the means for dismounting the tyre from the rim further comprises a pad attached to the housing, the pad being adapted to break the bead of the tyre to facilitate removal of the tyre from the rim.

18. The article handling apparatus according to claim 17 wherein the pad is releasably attached to the housing.

19. The article handling apparatus according to claim 17 wherein the pad is adapted to swivel with respect to the housing to allow alignment with a side wall of the tyre during dismounting of the tyre from the rim.

20. The article handling apparatus according to claim 17 wherein the pad comprises an angled profile and a pad member adapted to receive the side wall of the tyre.

21. The article handling apparatus according to claim 14 wherein at least one of the arm members are of variable length.

22. The article handling apparatus according to claim 14, further comprising a support frame, the handling frame having a central body pivotally attached to the support frame, and at least one hydraulic cylinder for pivotally moving the handling frame with respect to the support frame.

23. The article handling apparatus according to claim 22 wherein the support frame is adapted to be attached to a vehicle.

24. The article handling apparatus according to claim 23 wherein the vehicle comprises a front end loader.

* * * * *